US007509896B2

(12) United States Patent

Ovaere et al.

(10) Patent No.: US 7,509,896 B2

(45) Date of Patent: Mar. 31, 2009

(54) PROCESS FOR MACHINING IN SITU THE PERIPHERAL SURFACE OF A ROTATING PART, AND APPARATUS FOR CARRYING OUT SAID PROCESS

(75) Inventors: Peter Ovaere, Wemmel (BE); Yvon Becquet, Poulainville (FR)

(73) Assignee: Carbone Lorraine Applications Electriques, Amiens (FR)

( * ) Notice: Subject to any disclaimer, the term of this patent is extended or adjusted under 35 U.S.C. 154(b) by 661 days.

(21) Appl. No.: 11/246,548

(22) Filed: Oct. 11, 2005

(65) Prior Publication Data

US 2007/0087925 A1 Apr. 19, 2007

(51) Int. Cl.
*B23B 3/00* (2006.01)
*B23B 1/00* (2006.01)

(52) U.S. Cl. .......................................... 82/1.11; 82/47

(58) Field of Classification Search .................. 82/1.11, 82/47, 82, 105, 112, 54, 117, 152; 29/27 B, 29/598; 407/48, 40, 53, 103, 33, 34, 64
See application file for complete search history.

(56) References Cited

U.S. PATENT DOCUMENTS

| | | | | |
|---|---|---|---|---|
| 1,786,442 | A * | 12/1930 | Miller | 29/27 B |
| 2,357,765 | A * | 9/1944 | Rhindress | 82/117 |
| 2,718,177 | A * | 9/1955 | Karmann | 409/198 |
| 3,224,076 | A * | 12/1965 | Johnson, Jr. et al. | 29/597 |
| 3,722,144 | A * | 3/1973 | Rickrode et al. | 451/49 |
| 3,965,623 | A * | 6/1976 | Grutza et al. | 451/46 |
| 4,525,957 | A * | 7/1985 | Daniels | 451/63 |
| 5,065,651 | A * | 11/1991 | Amey | 82/1.11 |
| 5,177,842 | A * | 1/1993 | Hongo | 29/27 B |
| 5,287,607 | A * | 2/1994 | Hongo | 29/27 R |
| 5,454,284 | A * | 10/1995 | Sbalchiero et al. | 82/1.11 |
| 6,338,024 | B1 * | 1/2002 | Taniguchi et al. | 702/56 |

FOREIGN PATENT DOCUMENTS

| | | |
|---|---|---|
| EP | 1127657 | 8/2001 |
| JP | 07/214402 | 8/1995 |
| WO | 00/16945 | 3/2000 |

* cited by examiner

*Primary Examiner*—Willmon Fridie
(74) *Attorney, Agent, or Firm*—Dennison, Schultz & MacDonald

(57) ABSTRACT

A process for machining in situ the peripheral surface (1100) of a part rotating around an xx' axis (1), wherein a machining device is used comprising at least one plate (12) fixed to a frame and a tool holder (11) provided with a cutting tool (300) mounted on the said plate such that it can move along a YY' direction (3) which is substantially perpendicular to the xx' axis of rotation (1). The tool holder is installed on the plate (12) so that it can pivot around an axis oriented along a zz' direction represented by the point (4) which is substantially perpendicular to the YY' direction and to the xx' axis of rotation. By combining a rotation of the tool holder around the xx' axis and a translation of the center of rotation around the ZZ' axis (4) along the in-feed direction YY', the active end of the cutting tool (300) is moved in a plane perpendicular to the ZZ' axis (4). The device may also move along the third XX' axis.

21 Claims, 2 Drawing Sheets

Figure 1:
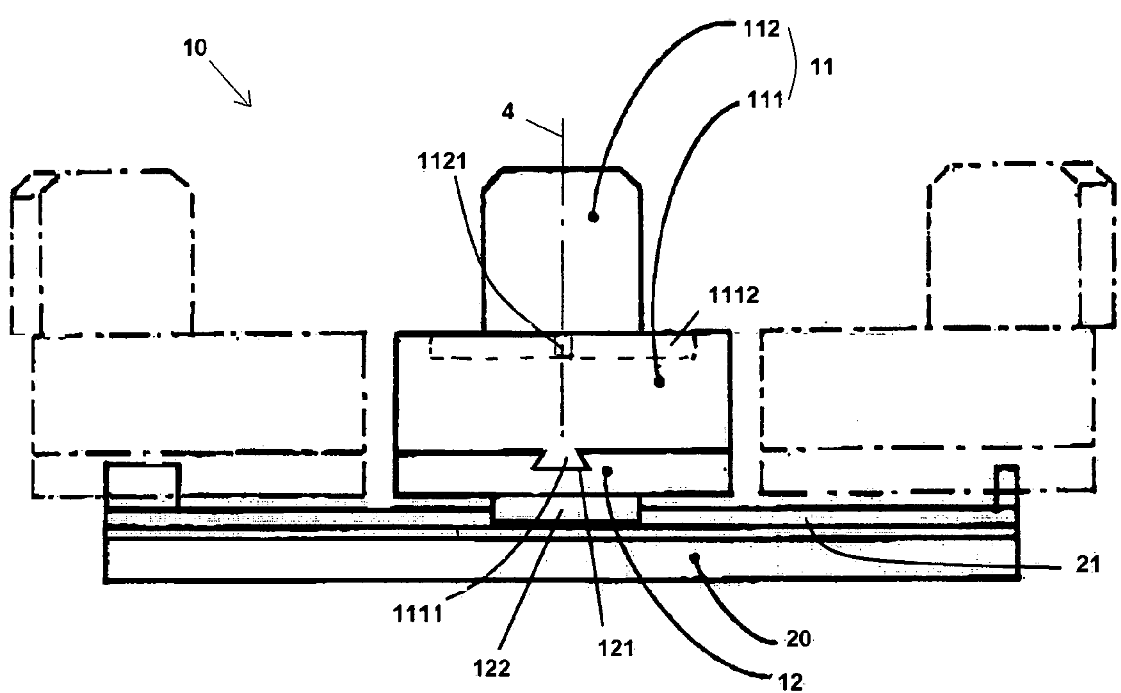

PROCESS FOR MACHINING IN SITU THE PERIPHERAL SURFACE OF A ROTATING PART, AND APPARATUS FOR CARRYING OUT SAID PROCESS

DOMAIN OF THE INVENTION

The invention relates to machining of rotating parts on site (on a machine and in the factory), and particularly to the renovation of commutators fixed to the armature or the rotor respectively of electrical motors, and that we will subsequently call "rotating contacts".

BACKGROUND OF THE INVENTION

The invention was made in order to renovate the surfaces of commutators or slip-rings of electric motors that have peripheral circularity defects resulting from the friction of the brushes that maintain a sliding electrical contact with them. It has been observed that these contacts no longer have a uniform radius around their entire periphery after the motor has been in operation for some time. To prolong the life of rotating contacts, limit brush wear and eliminate mechanical vibrations, a repair is made by abrasion resurfacing, typically using a stone or grinding wheel, or by machining of the degraded surface.

This type of repair is usually an expensive operation that immobilises the motor for a long period. With traditional methods, the work requires that the machine should be shutdown for a variable time depending on the power and dimensions of the electric motor and as a function of the difficulties encountered. The duration of such a shut down is typically between a few days and several months. The complete resurfacing operation includes uncoupling of the motor and its mechanical load, removal of the motor and transport to a well-equipped workshop in which the repair itself can be done. In general for powerful motors, the commutator is returned to the supplier for remachining. This has several disadvantages; firstly, a stock of spare motors has to be provided that will be used for the repair time of the disassembled motors; and secondly, reassembly requires special care to achieve difficult realignment of the commutator/armature axis or ring/rotor axis.

To avoid these difficulties an "in situ" repair of rotating contacts is done, in other words in the workshop without disassembly of the part supporting the contact surface to be ground. Typically, motors concerned by this type of "in situ" renovation are electrical motors with a power exceeding 3.5 kW, and in practice up to 650 MW. The "in situ" repair is made by removing accessories such as some brushes and their yokes to access the surface to be ground, and a device comprising a frame is used, the frame being installed on the static part of the motor, with attachment and straight turning means for carrying an abrasion or machining tool and an auxiliary means to drive the motor and thus rotate the rotating contact to be repaired, this means possibly being an auxiliary motor. The combination of the rotation movement of the rotating contact and axial displacements of the tool made using straight turning, resurfaces the degraded surface of the rotating contact. Resurfacing may be done by abrasion or by grinding, or by machining as described in WO00/16945.

WO00/16945 describes an in situ resurfacing process by machining for rotating contacts of electrical machines, that uses a very hard cutting tool, typically made of diamond, and inclined in a special manner from the normal to the surface to be ground passing through the said contact and in which swarf is evacuated by suction close to the tip of the tool.

For example, in order to access the surface of the rotating contact to be ground, one of the brush holder rows is removed, fitted with brushes making the sliding electrical contact between the rotor and the stator. The surface to be ground is in a particular spatial configuration due to the adjacent parts of the motor that have not been disassembled. For example, there is the part of the rotor comprising the winding and the commutator connecting wires or bars, at one end of the commutator. At the other end, there are often static mechanical accessories such as a wall of the motor casing, the bearing or brush holder accessories. Therefore the contact surface of the commutator is like the bottom of a globally concave surface with walls at the ends of the said surface to be ground, perpendicular to the axis of rotation, and with a large radial height. In particular, when resurfacing is done by machining, it is desirable that the resurfacing tool should be held such that the distance between its support and its active end is as small as possible so as to avoid vibrations, or at least to minimise their amplitude. In this case, it is necessary to move the tool holder inside the space delimited by this globally concave surface. However, the presence of these walls at one end and/or at both ends of the commutator makes it impossible to use a single tool to machine the entire surface of the commutator over its entire useful length, due to the size of parts used to hold the cutting tool. Moreover, the ends often have to be chamfered.

Therefore, the objective is to find a fast technical solution that can be used for renovation of the degraded surface of the commutator over its entire useful length, the said useful length being greater than the maximum straight turning displacement of the tool holder.

SUMMARY OF THE INVENTION

A first purpose of the invention is a method for in situ machining, in other words without prior disassembly of the part to be machined, of the peripheral surface of a rotating part, particularly the commutator or the slip-ring of an electric motor (that in the following description we will refer to using the common term "rotating contact"), rotating around an axis xx' fixed to a frame, and particularly the frame of the said electric motor, in which a machining device is used comprising at least one plate fixed to the said frame and a tool holder provided with a cutting tool and mounted on the said plate such that it can move along a direction YY' substantially perpendicular to the axis of rotation xx' of the rotating contact (direction subsequently called the "in-feed direction"), wherein the said tool holder is also installed on the said plate such that it can pivot around an axis oriented along a ZZ' direction substantially perpendicular to the in-feed direction YY' and to the axis of rotation xx' of the rotating part and wherein, by combining rotation of the tool holder around the axis XX' and translation along the in-feed direction YY' of the centre of rotation around the ZZ' axis, a displacement is imposed on the active end of the cutting tool in a plane perpendicular to the ZZ' axis such that the trajectory of the said active end of the cutting tool includes at least a straight part parallel to the xx' axis of rotation.

According to the present invention, the component along xx' of the displacement imposed on the end of the cutting tool is not zero so as to resurface the surface of the rotating contact.

The YY' and ZZ' axes and the XX' axis perpendicular to the plane formed by the previous axes are related to the machining device, while the xx' axis is related to the rotating part. The machining device is composed of several parts that move with respect to each other, at least one plate and one tool holder.

The XX', YY' and ZZ' coordinate system is defined on the plate. The tool holder can move along the YY' direction of the plate and it is installed on the said plate such that its rotation axis remains parallel to ZZ'. The plate fixed to the frame is, for example, provided with a first slide oriented along the YY' direction and the tool holder is provided with a first traveller with a section that has a shape complementary to the shape of the first slide, so that the tool holder can move along YY'. Obviously, the first slide located on the plate and the first traveller located on the tool holder are guide means with interchangeable complementary shapes arranged such that the rotation axis of the tool holder coincides with the ZZ' axis.

The plate is fixed to the frame in that it can either be fixed directly to the said frame, or it can move with respect to the frame by simple translation in its XX', YY' plane, by sliding on a base fixed on the said frame. Preferably, it slides along the XX' direction which by assembly (the plate was assembled such that its YY' axis is substantially perpendicular to the rotation axis xx' of the rotating part) is substantially parallel (within a few degrees) to the xx' rotation axis of the rotating part and therefore corresponds to a straight turning direction.

The XX' axis is not necessarily an axis of displacement of the plate since straight turning may at least partly be provided by the combination of rotation movements of the tool holder around ZZ' and displacement of the centre of rotation along YY'. Regardless of whether or not the plate and the tool holder are in straight turning along the XX' direction, there may be an angular offset between the xx' and XX' axes, which must be corrected such that the trajectory of the end of the cutting tool corresponds to the required machining. This correction requires a few preliminary setting measurements made once and for all after the device has been assembled; the angle between XX' and xx' may be measured directly, for example by laser sighting or it may be estimated by measuring the distances between the rotating contact and the tool at two locations, preferably as far as possible from each other along the XX' axis and chosen such that they enable measurements from the unworn turned surfaces of the rotating part.

If the machining device is used to resurface the worn surface of a rotating contact, the trajectory imposed on the end of the cutting tool may be simply in a straight line parallel to xx', but it may also have a different plane shape; in general, in the case of commutators, resurfacing requires an additional step to chamfer projecting corners of commutator segments, and in this case chamfers should be made at the ends of the surface to be machined, on the edges of commutator segments over a distance typically between 4 and 8 millimeters.

Preferably, pivoting imposed on the tool holder is symmetric about the plane formed by the YY' and ZZ' axes, in other words that results in a rotation between an angle $-\alpha$ and an angle $+\alpha$ with respect to the in-feed direction YY', the angle $\alpha$ typically being less than 60°. If the target trajectory of the active end of the cutting tool is a straight line parallel to the rotation axis xx', the angular amplitude $2\alpha$ is defined such that the required displacement for the end of the cutting tool along the xx' direction corresponds substantially to the length $2R \sin \alpha$ of the chord of the arc described by the active end of the tool rotating around ZZ', where R is the distance between the active end of the cutting tool and the centre C of rotation of the tool with respect to ZZ'. To obtain a straight trajectory parallel to the XX' axis perpendicular to YY' and ZZ', a movement is imposed on the tool holder along the in-feed direction YY', at the same time as a rotation by an angle $\beta$ around ZZ', such that the centre of rotation C moves by a length equal to substantially $R(1-\cos\beta)$. If XX' and xx' coincide, this straight trajectory of the tool provides a means of resurfacing the cylindrical part of the surface of the rotating contact. As already mentioned, a correction has to be made to take account of an angular offset between xx' and XX', if there is one.

Preferably, the displacement along the in-feed direction YY' of the centre of rotation around ZZ' and the rotation of the tool holder around the ZZ' axis, are motor driven, for example using a motor, moving the tool holder along the first slide (YY' direction) through a screw—nut type assembly, and a motor rotating the tool holder around the ZZ' axis. These motor driven movements may be controlled using a computer program such that the required trajectory is obtained by combination of the said movements. Furthermore, these movements can be slaved to improve machining parameters while cutting.

For size reasons, the rotation axis ZZ' of the tool holder may be virtual, in other words not materialised by a shaft around which the tool holder pivots. As in the example mentioned above, the tool holder may be composed of two parts free to move with respect to each other:

- a base that can displace along YY' and is provided with a gear moving around the arc of a circle in a plane parallel to (XX', YY') and at least one groove in the form of an arc of a circle concentric to the arc of circle in the gear;
- an insert holder, that holds the machining insert at one of its ends, and is provided firstly with a notched wheel which bears on the gear of the base and rotates around itself following a trajectory along an arc of a circle in a planetary movement, and secondly with at least one protuberance parallel to the ZZ' axis that slides along a groove in the base describing an arc of a circle around the base.

Rotation of the notched wheel may be motor driven. The tool is held in contact on the gear during cutting and the notched wheel is held on the gear by one or several protuberances that are oriented parallel to ZZ', and that slide in a groove around an arc of a circle concentric with the arc of circle in the gear.

Since the surface to be machined may be long, it is advantageous if the plate is fixed to a base fixed onto the said frame, rather than fixed directly on a fixed point of the frame. The base itself is provided with a second slide running along the XX' direction substantially parallel to the axis of rotation xx' of the rotating part and the plate is provided with a second traveller, which has a section with a shape complementary to the shape of the second slide. The plate is thus mounted on the base such that it can move along the XX' direction of the second slide. As a result, a plane displacement may be imposed on the active end of the cutting tool by combining a rotation of the tool holder around the ZZ' axis with a translation of the centre of rotation around ZZ' along the in-feed direction YY' and a translation of the plate in the straight turning direction XX'.

The length of the base may be defined such that, if L is the length of the surface to be ground, the amplitude H of the straight turning movement of the plate is equal to at least $L-2R \sin \alpha_0$, where $2\alpha_0$ is the maximum amplitude of the rotation angle of the tool holder around the ZZ' axis.

As we have already seen, slaving of the YY' axis also makes it possible to compensate for parallelism faults between the centre line of the commutator xx' and the XX' straight turning direction. However, this correction can only be limited and as the straight turning length increases, the need for good alignment between the xx' and XX' axes becomes more important. Typically, for a length of the surface to be resurfaced of the order of 600 mm, it is preferable to aim at the smallest possible angle between xx' and XX', typically less than 1°.

As already mentioned for the plate and the tool holder, movement of the plate (straight turning along XX') is also preferably motor controlled. For example, the base is provided with a motor that moves the plate along the second slide, using a screw—nut type assembly. Movements thus motor driven may be controlled using a computer program such that the required trajectory is obtained by combination of the said movements.

Furthermore, these movements may be slaved simultaneously to improve machining parameters during cutting. The complete trajectory of the machining tool can be defined firstly as a function of geometric data related to the surface to be machined and geometric data related to machining start and end positions imposed on the cutting tool, and secondly as a function of reactions of the rotating part (rotation speed variations and vibrations) that are continuously measured. Thus, the complete trajectory of the tool may be modified during machining as a function of constraints imposed on the tool and the rotating part.

With this type of device, the machining method according to the invention may advantageously be used automatically if the slaved movements are computer controlled. The software used to control machining comprises two main parts:

a) an interface with the user; the software communicates with the user through the screen based on simple automatic questions, such that there is no need to be a specialist. The user inputs the "start" and "end" positions imposed on the tool, for example using a joystick. To resurface the surface of a rotating contact, he also inputs the diameter of the part to be resurfaced to complete the information necessary for programming.

b) a programming software that calculates the trajectory to be imposed on the end of the tool as a function of data supplied by the user and tooling reactions measured continuously during machining; the said software controls motor driven means to automatically make displacements along the XX', YY' axes and rotation around the ZZ' axis.

The calculated trajectory includes an entry trajectory starting from a position reliably located outside the area occupied by the rotating part in rotation, as far as an entry point close to the surface to be machined, a "working trajectory" comprising several machining passes, the last being called the finish pass, and an exit trajectory that puts the tool in a position reliably located away from the rotating part in rotation. The "working trajectory" is defined as the work continues as a function of some specific parameters related to the cutting quality, the cutting quality being measured and possibly causing a modification to the advance of machining, including the number and shape of trajectories in intermediate passes. Preferably, the finishing pass is automatically triggered when a physical measurement checks that there is permanent contact between the cutting tool and the surface to be ground. To achieve this, the end of the tool may typically be equipped with a diamond cutting tip, such that it can emit a signal to the computer indicating that it is in continuous contact over the entire surface of the part to be worked.

For example, the rotation speed of the rotating part around xx' is permanently controlled by a sensor. If the speed varies, the programming is continuously readapted. Thus, a drop in the rotation speed resulting from excessive advance is automatically corrected by reducing the advance along XX', which itself influences the rotation speed around ZZ' and the correction to the displacement of the centre of rotation around YY'.

To obtain the signal indicating that there is a permanent contact between the cutting tool and the surface to be ground, it would for example be possible to establish an electrical circuit between the rotating contact and the cutting tool, electrically isolating the cutting tool from the frame. By putting the rotating contact and the cutting tool at different potentials, a current is set up in the circuit as soon as the cutting tool comes into contact with the surface to be ground. On the other hand, the current stops as soon as the tool is no longer in contact with the surface to be ground. If there is a current circulating continuously in this circuit throughout the duration of the machining pass, there is permanent contact and therefore machining can be terminated with the finishing pass.

The machining quality may be verified continuously using a vibration pick-up. By firstly setting up cutting tests with different machining parameters (advance along XX', rotation speed, etc.), vibrations generated under these conditions are recorded and correlated with the machining quality obtained under these conditions, for example evaluated by an average roughness Ra. Thus, a relation is set up between the vibrations generated (for example their amplitudes and/or their frequencies) and the machining quality. Based on this relation, one or several alarm thresholds can be defined. If the amplitude of the measured vibrations during machining becomes greater than the least of these thresholds, the system informs the user. If the vibration amplitude increases further after this "alarm phase" and exceeds an even higher threshold, the cutting tool is automatically withdrawn from the working area; machining is stopped and a restart procedure is suggested to the user as a function of recorded criteria.

Another purpose of the invention is a device for machining the peripheral surface of a rotating part, particularly the commutator or the ring of an electric motor rotating around a fixed axis xx' of a frame, particularly the frame of the said electric motor, the said device comprising at least one plate that will be made fixed to a fixed point on the said frame and a tool holder provided with a cutting tool and installed on the said plate such that it can move along a YY' direction substantially perpendicular to xx', wherein the said tool holder is also mounted on the plate such that it can pivot around an axis oriented along the ZZ' direction substantially perpendicular to a YY' direction and perpendicular to the axis of rotation xx' of the rotating contact. For size reasons, the rotation axis ZZ' of the tool holder is virtual, in other words not materialised by a shaft around which the tool holder pivots. The tool holder according to the invention is composed of two parts free to move with respect to each other:

a base that can displace along YY' and is provided with a gear moving around the arc of a circle in a plane parallel to (XX', YY') and at least one groove in the form of an arc of a circle concentric to the arc of circle in the gear;

an insert holder that holds the machining insert at one of its ends, that is provided firstly with a notched wheel which bears on the gear of the base and rotates around itself following a trajectory along an arc of a circle in a planetary movement, and secondly with at least one protuberance parallel to the ZZ' axis that slides along a groove in the base describing an arc of a circle around the base.

The plate fixed to the frame is for example fitted with a first slide oriented along YY' direction and the tool holder is provided with a first traveller with a section that has a shape complementary to the shape of the first slide so as the tool holder can move along YY'. Obviously, the first slide located on the plate and the first traveller located on the tool holder are interchangeable complementary shaped guiding means, arranged such that the rotation axis of the tool holder coincides with the ZZ' axis.

Rotation of the notched wheel may be motor driven. The tool is held in contact during cutting and the notched wheel is held in contact on the gear by one or several protuberances that are oriented parallel to ZZ' and that slide in a groove around an arc of a circle concentric with the arc of circle in the gear.

Preferably, pivoting imposed on the tool holder is symmetric about the plane formed by the YY' and ZZ' axes; in other words it results in a rotation between an angle $-\alpha$ and $+\alpha$ with respect to the YY' direction, the angle $\alpha$ typically being less than 60°.

Preferably, the plate is not fixed directly on a fixed point of the frame, but onto a base fixed onto the said frame. The base itself is provided with a second slide running along the XX' direction substantially parallel to the axis of rotation xx' of the rotating part, and the plate is provided with a second traveller, which has a section with a shape complementary to the shape of the second slide. The plate is thus mounted on the base such that it can move along the XX' direction of the second slide. The base may be in one or several parts, provided that the second slide moves along this perfectly straight direction and can move the plate smoothly.

Straight turning of the plate along XX' is preferably motor driven. For example, the base is provided with a motor that displaces the plate through a screw—nut type assembly, along the second slide. The movements thus motor driven can be controlled using a computer program such that the required trajectory is obtained by combination of the said movements.

The tool holder is designed so that it does not depend on the direction of rotation of the rotating part (it can be fixed at the top or at the bottom).

DETAILED DESCRIPTION OF THE INVENTION

Figures

Figure 2:
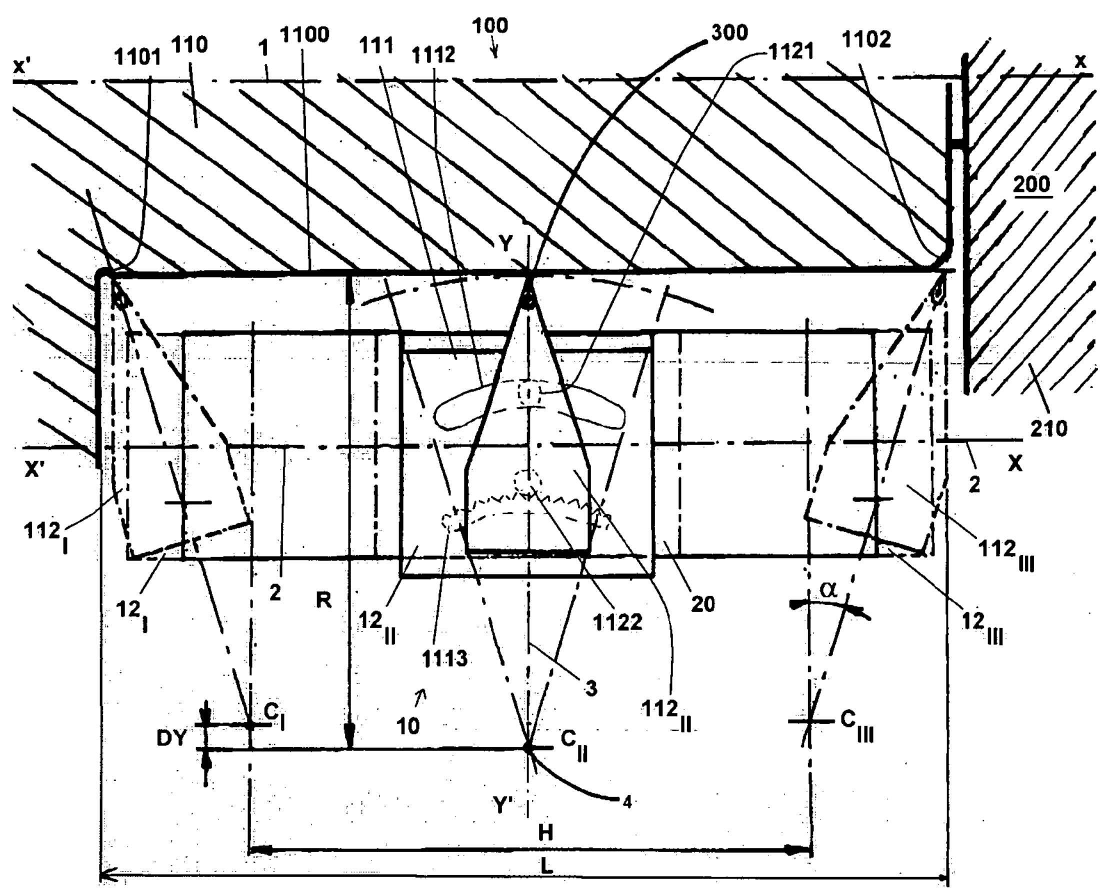

FIG. 1 illustrates a front view and FIG. 2 illustrates a top view of a machining device according to the invention used for in situ resurfacing of the surface of rotating contacts of electrical motors, with the extreme spatial configurations of the plate and tool holder shown in chain dotted lines.

The machining device shown in this example includes two parts: a base (20) fixed to the frame of the motor (not shown) and a plate+tool holder assembly (10). The tool holder (11) is fitted at its end with a hard machining tip (300), typically greater than 10 on the Mohs scale, for example made of diamond. The tool holder comprises two parts free to move with respect to each other:

- a base (111) that can displace along YY' and is provided with a gear (1113) moving around the arc of a circle in a plane parallel to (XX', YY') and a groove (1112) in the form of an arc of a circle concentric to the arc of circle in the gear;
- an insert holder (112) that holds the machining insert (300) at one of its ends, that is provided firstly with a notched wheel (1122) which bears on the gear (1113) of the base and rotates around itself, following a trajectory along an arc of a circle in a planetary movement, and secondly with a protuberance (1121) parallel to the ZZ' axis that slides along the groove (1112) in the base describing an arc of a circle around the base.

It will be noted that the axis ZZ' is not specifically shown as such in the drawings but is represented as the line that passes through point (4) and is perpendicular to the plane of the drawing and is the tool holder rotation axis.

Depending on the power of the electric motor, the diameter of the surface of the commutator to be ground typically varies from 100 to 6000 mm. A row of brush holders fitted with brushes making the sliding electrical contact between the rotor (100) and the stator (200) has been removed, to provide access to the surface of the rotating contact to be ground. The surface of the commutator (110) to be ground is then in a particular spatial configuration due to the nearby parts of the motor that have not been disassembled. At the left end of the commutator, there is the part of the rotor (120) that includes the winding and the connector wires. At the other end, there is a bearing (210). Therefore the contact surface of the commutator is at the bottom of a globally convex surface, with walls at the ends of the said surface to be ground perpendicular to the rotation axis xx', and with a large radial height. The ends of the surface of the commutator (110) to be ground also have to be chamfered (chamfers 1101 and 1102).

The assembly forms a concave area that is difficult to access with a single tool. The area to be ground extends over a length equal to about 300 mm. Due to the size of the straight turning device and the thickness of the tool holder, the cutting tool cannot reach substantially 50 mm at each end of this area.

The base (20) is fixed to the motor frame by attachment onto one of the brush holder yoke beams. It is fitted with a second slide (21) oriented along the XX' direction substantially parallel to the axis of rotation xx' of the rotating contact. The plate (10) is fitted with a second traveller (122) that has a section with a shape complementary to the shape of the second slide (21). The plate (12) is fixed to the frame of the electric motor through the base (20). The base (20) is provided with an electric motor that moves the plate (12) along the second slide (21), through a screw-nut type assembly.

The plate is also provided with a first slide (121) oriented along a direction YY' substantially perpendicular to the rotation axis xx'. The base (111) of the tool holder (11) is provided with a first traveller (1111) that has a section with a shape complementary to the shape of the first slide (121). Displacement along the in-feed direction YY' is motor driven using an electric motor, through a screw—nut type assembly.

Due to the notched wheel (1122) that bears on the gear (1113) of the base and rotates around itself, follows a trajectory in an arc of a circle along a planetary movement, the insert holder (112) can pivot around an axis oriented along a ZZ' direction (4) substantially perpendicular to the in-feed direction YY' and the axis of rotation xx' of the rotating contact. The rotation of the notched wheel is motor driven by an electric motor. The cutting tool (300) is held in place during cutting and the notched wheel is held in place bearing on the gear by the protuberance (1121) of the insert holder (112) that slides in the groove describing the arc of a circle (1112) formed in the base (111). The protuberance (1121) is oriented along the ZZ' axis and the groove describing the arc of a circle (1112) was machined such that the protuberance can slide in bearing on the wall of the groove remaining parallel to the ZZ' axis.

The different motors associated with the XX', YY' and ZZ' axes operate such that the active end of the cutting tool (300) follows an imposed trajectory in a plane perpendicular to ZZ'. Preferably, this trajectory at least partly includes a straight line part parallel to xx', to resurface the cylindrical surfaces.

The pivoting imposed on the insert holder is symmetric about the plane formed by the YY' and ZZ' axes; starting from the angle $-\alpha$ (origin of the YY' angles, clockwise direction) in the left end position of the device, the sleeve pivots around ZZ' until it reaches the angle $+\alpha$ in the right end position. The angle $\alpha$ in this case is close to 17°.

The distance R from the centre of rotation C (virtual point, outside the tool holder) at the end of the tool is about 170 mm.

Thus, the combined translation movement along YY'+rotation of the tool holder around ZZ' extends the straight turning distance by almost 100 mm. When the tool is inclined at 17.1° (end positions), the correction to be made to the position of the centre of rotation C consists of bringing it closer to the xx' axis by about 7.5 mm (DY).

The base (20) is fixed onto a brush holder bar (not shown). In this case it is interchangeable as a function of the length of the commutator, which in practice can vary from 80 to 600 mm.

Machining is done automatically using a computer program. The rotation speed of the rotating contact is permanently checked by a probe. Programming is continuously readapted if the speed varies. The end of the tool, typically a diamond-cutting tip, continuously emits a signal to the computer. As soon as it is in continuous contact over the entire surface of the part to be worked, the finish pass is performed.

REFERENCES

- 1 axis of rotation xx'
- 2 straight turning direction XX'
- 3 in-feed direction YY'
- 4 tool holder rotation axis
- C tool holder centre of rotation ($C_I$) left end position; ($C_{II}$) central position; ($C_{III}$) right end position
- 10 plate+tool holder assembly
- 11 tool holder
- 111 tool holder base
- 1111 first traveller
- 1112 groove around the arc of a circle
- 1113 gear around the arc of a circle
- 112 insert holder ($\mathbf{112}_I$) left end position; ($\mathbf{112}_{II}$) central position; ($\mathbf{112}_{III}$) right end position
- 1121 protuberance
- 1122 notched wheel
- 12 plate ($\mathbf{12}_I$) left end position; ($\mathbf{12}_{II}$) central position; ($\mathbf{112}_{III}$) right end position
- 121 first slide
- 122 second traveller
- 20 base
- 21 second slide
- 100 rotor
- 110 commutator
- 1100 surface to be ground
- 1101 chamfer on edge of the commutator segment
- 1102 chamber on edge of the commutator segment
- 120 part of rotor comprising the winding and connector wires
- 200 stator
- 210 bearing
- 300 machining tip
- R distance between the active end of the machining tip and the centre of rotation of the insert holder
- H maximum travel distance of the base
- L length of the surface to be ground
- α rotation axis of the insert holder around ZZ'
- DY displacement imposed on the centre of rotation between the median position (I) and an end position

The invention claimed is:

1. A process for in situ machining of the peripheral surface of a rotating part, such as the commutator or slip-ring of an electric motor, which rotating part rotates about an axis (XX') and which is fixed to a stationary frame, said process comprising;

securing a machining tool having a cutting part mounted for movement on a tool holder plate to said stationary frame, moving said tool along an in-feed line (YY') substantially perpendicular to the axis (XX') toward said part to be machined, said tool also moving pivotally about an axis (ZZ') which is substantially perpendicular to the line (YY') and axis (XX'), wherein, by combining rotation of the tool around the ZZ' direction and translational movement along the in-feed line (YY') of the center of rotation around axis (ZZ'), the machining tool is displaced in a plane perpendicular to the axis (ZZ') such that the trajectory of the cutting part includes at least one straight part parallel to the axis (XX') of rotation.

2. A process according to claim 1, wherein the said imposed trajectory includes two additional straight portions at the end of said straight part, inclined with respect to the first portion and serving to chamfer the ends of the surface to be machined.

3. A process according to claim 1, wherein pivoting of the tool holder plate is symmetric in regard to the plane formed by the YY' and ZZ' axes resulting in a rotation between an angle $-\alpha$ and an angle $+\alpha$ with respect to the in-feed direction YY', the angle α preferably being less than 60°.

4. A process according to claim 1, wherein the displacement along the in-feed direction YY' of the center of rotation around ZZ' and the rotation of the tool holder plate around the ZZ' axis are motor driven and controlled by a computer program such that the required trajectory is obtained by the combination of said movements.

5. A process according to claim 1, wherein the active end of the machining tool is displaced by combining a rotation of the tool holder plate around the ZZ' axis with a translation of the center of rotation around ZZ' along the in-feed direction YY' and a translation of the tool holder plate in the straight turning direction XX'.

6. A process according to claim 5, wherein the displacement of the machining tool the rotation of the tool holder around the ZZ' axis and the displacement along the XX' direction of the tool holder plate are motor driven and controlled by use of a computer program so that the required trajectory is obtained by the combination of the said movements.

7. A process according to claim 6, wherein the displacement of the machining tool the rotation of the tool holder around the ZZ' axis and the displacement along the XX' direction of the tool holder plate are slaved to improve machining parameters while machining.

8. A process according to claim 7, wherein the slaved movements are computer software controlled, the computer used to control machining including an input screen and an interface for communication with the user through the screen said process including the steps of inputting into the computer the "start" and "end" positions imposed on the tool and the diameter of the part to be resurfaced;

said software calculates the trajectory to be imposed on the end of the tool as a function of data supplied by the user and tooling reactions measured continuously during machining, said software controlling motor driven means to automatically make displacements along the XX', YY' axes and rotation around the ZZ' axis.

9. A process according to claim 8, wherein the rotational speed of the part rotating around the xx' axis is permanently controlled by a sensor the speed so that if the speed varies, the programming is continuously readapted.

10. A process according to claim 8, wherein the end of the tool, preferably a diamond cutting tip, is equipped to emit a signal to the computer indicating that it is in continuous contact over the entire surface of the part to be machined.

11. A process according to claim 1 and further including the step of monitoring the cutting quality continuously using a vibration pick-up.

12. A process according to claim 11, wherein the step of monitoring is conducted initially with different machining parameters in order to set up a relation between the vibrations generated and the machining quality obtained, and wherein an alarm is preset to activate when a measured vibration amplitude is higher than a predefined trigger threshold.

13. A process according to claim 12, wherein the machining tool is automatically withdrawn from the working area as soon as soon as a critical level of vibrations is achieved.

14. Apparatus for in situ machining of the peripheral surface of a rotating part such as the commutator or slip-ring of an electric motor, which rotating part rotates about an axis (XX') that is fixed to a stationary frame, said apparatus comprising, at least one plate that is fixed to said frame, a tool holder mounted on said plate, a cutting or abrading tool secured to said plate and movable along a line (YY') that is substantially perpendicular to the axis (XX '), said tool holder being pivotally mounted on the said plate so as to be rotatable about an axis (ZZ ') which axis is substantially perpendicular to the line (YY ') and to the axis (XX '), said tool holder comprising two parts that are free to move with respect to each other, said parts being, a base that is moveable along line (YY ') and which is provided with a gear that is adapted to move around an arc of a circle in a plane parallel to axis (XX ') and axis (YY '), said base having at least one arcuate shaped groove concentric with the arc of a circle in the gear; and an insert holder which secures and holds said cutting or abrading tool at one end thereof, said holder being provided with a notched wheel which engages with the gear on the base and which rotates about itself following a trajectory along the arc of a circle in a planetary manner, said holder also having at least one protuberance that is parallel to axis (ZZ ") and which slides within said groove in said base, describing an arc of a circle around the base.

15. An apparatus according to claim 14, wherein the plate that is fixed to said frame is provided with a first slide oriented along the YY ' direction and the tool holder is provided with a first traveler that has a section having a shape complimentary to the shape of the first slide.

16. An apparatus according to claim 14, wherein the tool holder is mounted on said plate and is adapted to pivot symmetrically in regard to the plane formed by the YY ' and ZZ ' axes between an angle $-\alpha$ and an angle $+\alpha$ with respect to the YY ' direction, $\alpha$ preferably being less than 60 °.

17. An apparatus according to claim 14, wherein the movement along the YY' direction of the center of rotation around the ZZ' axis and the rotation of the tool holder around the ZZ' axis are motor driven.

18. An apparatus according to claim 14, and further including a base fixed on a fixed part of the stator of the electric motor and upon which the plate is fixed so that the said plate can move along a direction XX' substantially parallel to the XX' axis of rotation of the rotating part.

19. An apparatus according to claim 15 wherein said base is provided with a second slide extending along the XX' direction substantially parallel to the XX' axis of rotation of the rotating part and said plate is provided with a second traveler having a shape complementary to the shape of the second slide, so that it can move along the XX ' direction of the second slide.

20. An apparatus according to claim 18, and further including motor means and wherein the movement along the YY' axis of the center of rotation around the ZZ' axis, the rotation of the tool holder around the ZZ' axis and the movement along the XX' direction of the plate made using said motor means.

21. An apparatus according to claim 20, wherein said motor means comprises a plurality of motors, the said motors being controlled simultaneously, and a computer program for controlling said motors, to impose the required trajectory on the end of the cutting tool.

* * * * *